United States Patent Office 3,459,838
Patented Aug. 5, 1969

3,459,838
PARTIALLY BLOCKED CYCLIC PHOSPHO-
NITRILIC HALIDES
Gerald J. Klender, Bloomingdale, N.J., assignor to Uniroyal, Inc., New York, N.Y., a corporation of New Jersey
No Drawing. Filed June 28, 1965, Ser. No. 467,736
Int. Cl. C07d 105/02; C08g 33/16
U.S. Cl. 260—973                            11 Claims

ABSTRACT OF THE DISCLOSURE

Non-geminal derivatives of phosphonitrilic trimers and tetramers, having low functionality (2 or 3) may be obtained by performing a blocking reaction in a secondary alcohol solvent, such as isopropyl alcohol. The synthesis depends on the use of a non-participating solvent such as isopropyl alcohol.

---

This invention relates to the preparation of derivatives of phosphonitrilic ring compounds, such as 2,4-dichloro-2,4,6,6-tetraphenoxy - 1,3,5,2,4,6 - triazatriphosphorine. More specifically, the invention teaches the selective preparation, in high yields, of non-geminal derivatives of the aforesaid ring compounds, having low functionality and useful for the preparation of polymers having inorganic "backbones."

The ring compounds, the derivatives of which are the subject of the instant invention, have the formulae:

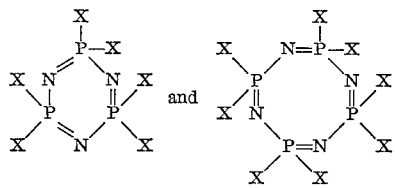

where X is a halo group, most preferably, chloro- and bromo-, and are formed by the trimerization and tetramerization, respectively, of phosphonitrile halides. The trimer, $(PNX_2)_3$, is called hexahalo-1,3,5,2,4,6-triazatriphosphorine, and the tetramer, $(PNX_2)_4$, octahalo-1,3,5,7,2,4,6,8-tetrazatetraphosphorine.

Polymers prepared from substituted phosphonitrile halides have been described in patent application, Ser. No. 382,385, filed July 13, 1964. In that invention, some of the reactive halo groups on the phosphonitrile ring are replaced with blocking or unreactive groups, such as phenyl, phenoxy, and dimethyl amino, part of the remaining halogen atoms are then replaced by alkoxy groups, and a polymer is formed by the intermolecular elimination of alkyl halides. In the backbone of such a polymer, phosphonitrile rings are connected by oxygen through P—O—P linkages; thus such a polymer has a carbon-free backbone with outstanding thermal stability and flame resistance. Other advantages of this polymer over previously described materials are in better appearance, higher molecular weight and improved mechanical properties. These advantages are attributed to the reduction in functionality of the polymer which allows more linear, longer chains to be produced before the polymer becomes insoluble and intractable.

While the general approach described above is theoretically sound, it suffers from some drawbacks. Most important is the lack of selectivity of the blocking reaction, i.e., the reaction in which the blocking groups are added. Rather than formation of the desired non-geminal di- or tri-functional compound, a broad spectrum of products results. Some of the reaction products are fully blocked, while others remained with four or five functional groups. Additionally, even where the desired functionality is achieved, part of the compounds formed are unacceptable because of their geminal structure, i.e., the reactive groups are bonded to the same phosphorus atom. Only with non-geminal di- or tri-functional compounds i.e., reactive groups bonded to different phosphorous atoms in the ring, does the subsequently formed polymer have the phosphonitrilic ring as part of the chain or backbone.

In accordance with this invention it has been found that mono-, di- and tri-functional non-geminal derivatives of the phosphonitrile halide trimers and tetramers may be formed by carrying out the blocking reaction in a secondary alcohol. The mono-functional compounds are useful as chain-terminating agents. Most preferably 2-propanol is employed as the reaction medium, though other secondary aliphatic or alicyclic alcohols having up to 12 carbon atoms may be used, such as 2-butanol, 2-pentanol, 3-pentanol, 3-methyl-2-butanol, 2-octanol, cyclohexanol, 4-methyl-2-pentanol, and 2,6-dimethyl-4-heptanol. Primary alcohols, such as methanol and ethanol, are effective in controlling the mode of substitution between the phosphonitrilic halide and the alkali metal salt of the non-reactive group, but they also react to partially displace the chlorines with alkoxy groups and therefore produce mixtures of difficultly separable products and reduce the yield of the desired products. A mixture of secondary alcohol solvents, such as a mixture of 2- and 3-pentanols can also be used. The preferred solvent is 2-propanol because it is readily available and can be easily separated from the reaction mixture by virtue of its high volatility (low atmospheric boiling point) or its high water solubility. In general, I prefer to use from 7.5 to 68 times the weight of solvent as compared to the weight of phosphonitrile halide in the reaction mixture.

The use of closely related oxygenated solvents, including acetone, ethylene glycol dimethyl ether and tetrahydrofuran, results in a broad spectrum of isomers containing both non-geminal and geminal reactive groups. The product that is isolated is a mixture of the more completely and randomly blocked derivatives in lower yields. In other solvents, such as benzene and diethyl ether, the alkali metal salts of the blocking group compound were found to be highly insoluble and only between two and three of such groups could be introduced, even after long reaction times. The yields were low and the products were randomly substituted.

Suitable non-reactive or blocking groups are the phenoxy and phenylthio groups and ring-substituted derivatives thereof wherein one or more of the ring hydrogens are replaced by (1) an alkyl group having from 1 to 8 carbon atoms, (2) a halo group, particularly, chloro-, fluoro-, and bromo-, (3) a fluoromethyl group such as trifluoromethyl, (4) a phenoxy group, (5) a phenyl group, and/or (6) a benzyl group. The total number of carbon atoms of the group or groups replacing the ring hydrogen must not exceed eight.

INTRODUCTION OF THE BLOCKING GROUPS

The non-reactive or blocking group is introduced on the phosphonitrile ring by the reaction of an alkali metal salt of the blocking group with the phosphonitrile halide in alcohol solution. The parent of the alkali metal salt must have an acidic hydrogen which will completely react with alkali metal in the presence of a secondary alcohol. Such compounds having the necessary acidic hydrogen include phenol, phenyl mercaptan, and their ring-substituted derivatives. The blocking group when introduced on the phosphonitrile ring must then be stable to heat, hydrolysis and rearrangement, and must not undergo reaction in the copolymerization of the monomers.

Some of the phenols which may be used in forming the partially blocked phosphonitriles are as follows: phenol; o-, m-, and p-cresols; o-, m-, and p-chlorophenols; o-, m-, and p-bromophenols; o-, m-, and p-fluorophenols; o-, m-, and p-methoxyphenols; o- and p-phenylphenols; o- and m-phenoxyphenols; m - trifluoromethylphenol; octylphenol; 1,1,3,3-tetra-methylbutylphenol; 4-chloro - 3,5 - dimethylphenol; 2,4-, 3,5-, 2,6-, 2,5- and 3,4-xylenols; 2,6-di-t-butylphenol; 2,4-dichlorophenol; 2,4,6-tribromophenol; 2,4,5- and 2,4,6-trichlorophenols; 2,3,4,6 - tetrachlorophenol; pentachlorophenol; pentabromophenol; p-benzyl phenol; benzenethiol; p-chlorobenzenethiol; 4-fluorobenzenethiol; p-toluenethiol; trifluoromethylbenzenethiol; pentachlorobenzenethiol; p-benzylbenzenethiol; p-phenoxybenzenethiol; m-phenylbenzenethiol; pentabromobenzenethiol.

The introduction of these blocking groups results in the formation of the following types of compounds, where Y represents the blocking group or combinations of blocking groups:

$P_3N_3Y_5Cl$;  $P_3N_3Y_5Br$;  $P_3N_3Y_4Cl_2$;  $P_3N_3Y_4Br_2$; $P_3N_3Y_3Cl_3$; $P_3N_3Y_3Br_3$; $P_4N_4Y_7Cl$; $P_4N_4Y_7Br$; $P_4N_4Y_6Cl_2$; $P_4N_4Y_6Br_2$; $P_4N_4Y_5Cl_3$; $P_4N_4Y_5Br_3$; $P_4N_4Y_4Cl_4$; $P_4N_4Y_4Br_4$; $(C_6H_5)_2P_3N_3Y_2Cl_2$; $(C_6H_5)_2P_3N_3Y_2Br_2$. In all cases, these partially blocked materials have no more than one halogen atom on each phosphorus in the ring compound. In the species $P_4N_4Y_6Y_2$ and $P_4N_4Y_5X_3$ (where X=Cl, Br) positional isomers are possible.

I prefer to use phenoxy, o-chlorophenoxy, p-chlorophenoxy, p-methylphenoxy, m-trifluoromethylphenoxy, and phenylthio as the non-reactive blocking substituents in the phosphonitrile compound.

Other phosphonitrilic halides, besides the trimer and tetramer previously discussed, useful as the starting material are the partially substituted derivatives thereof. Broadly, these derivatives may be defined as materials having a number of reactive groups greater than desired as, for example, $P_3N_3(C_6H_5)_2Cl_4$.

While starting material of a single species may be advantageously used, such as $(PNCl_2)_3$, $(PNCl_2)_4$, $(PNBr_2)_3$, $(PNBr_2)_4$, admixtures of more than one species are also of interest. Thus, mixtures of 70 to 90% of $(PNCl_2)_3$ and 30 to 10% of $(PNCl_2)_4$ can be used to form monomers which have more cross-linking sites than are obtained with $(PNCl_2)_3$ alone. $(PNCl_2)_3$ is the preferred starting material because it is readily available, and because its cross-linking sites can be more easily controlled for making "tailor-made" monomer mixtures.

Initially, the phosphonitrilic halide starting material is reacted with the selected alkali metal compound to introduce the desired number of non-reactive groups. The particular reaction product obtained depends, of course, on the phosphonitrilic compound selected and the molar ratio of the reactants. For example, it four moles of the blocking compound are reacted with one mole of $P_3N_3Cl_6$, a dihalide is the preponderant reaction product; on the other hand, if the concentration is about 3 moles of the blocking compound for each mole of the hexahalide, the reaction product is predominantly a trihalo compound; here again a non-geminal material is formed; i.e., a single chlorine atom remains on each of the P atoms of the nucleus. Similarly, appropriate ratios are selected where the tetramer is the starting material.

As will be obvious to those skilled in the art, one blocking group is introduced for each halide radical sought to be replaced.

If a mixture of a trifunctional and a difunctional halide monomer is desired, it can be obtained either by mixing the separately prepared trihalide and dihalide, or by interacting between three and four moles of the alkali metal salt of the blocking group donor with the phosphonitrilic halide. The difunctional material can also be prepared from the trifunctional derivative by further reacting the trifunctional derivative with one mole of the alkali metal salt of a non-reactive group in a suitable alcohol solvent. In this way, monomers containing more than one type of non-reactive group can be obtained.

The blocking reaction is conducted at a temperature from 0° C. to 160° C., preferably from 15° to 100° C. The reaction is carried out in the liquid phase, and any desired pressure may be used. Depending on the desired monomer, and inversely on the temperature, the reaction time is generally from 2 hrs. to 200 hrs., preferably from 4 to 6 hrs.

The reaction is initially exothermic. The concentration of reactant materials is not critical as long as the reaction mixture is homogeneous; however, at higher concentrations complete replacement of the desired amount of halogen becomes more difficult, and longer reaction times or higher temperatures are required for completion of the reaction. The method of addition is not critical; the phosphonitrilic halide can be added as a solid or as an alcohol solution to the alkali metal salt of the non-reactive group in alcohol solution. The reactions are run in an inert atmosphere to prevent hydrolysis of the alkali metal salt.

DETERMINATION OF STRUCTURE

The structure of the reaction products obtained in accordance with the invention was evaluated from reaction rate studies, proton NMR, and phosphorus NMR spectroscopy. In the proton NMR study, the $P_3N_3(OC_6H_5)_4Cl_2$ and $P_3N_3(OC_6H_5)_3Cl_3$, as produced in Examples 1 and 2, were first aminated with dimethylamine to form a reaction product, which was analysed for structure.

FORMATION OF POLYMERIZABLE MATERIAL

Since the blocked compounds produced in accordance with the aforesaid teaching cannot be polymerized by themselves, further processing is necessary, the particular procedure depending on whether it is desirable to form a polymerizable single monomer or a comonomer which may be polymerized with a second comonomer.

To form a polymerizable monomer, the dihalo compound, for example, is modified so that one halo group is replaced by an alkoxy group. The modified compound forms a polymer by the following condensation reaction:

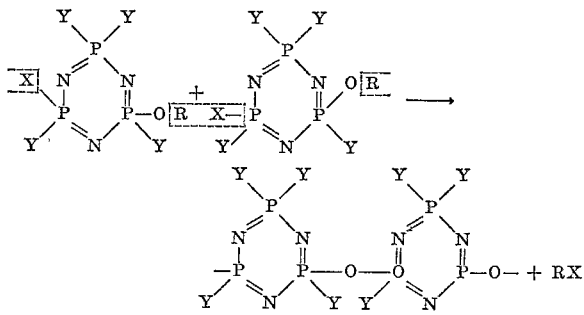

where Y represents the blocking group, X the halo group and OR the alkoxy group.

Alternatively, the blocked derivative may be reacted to replace all of the halo groups with alkoxy groups. This results in the formation of a dialkoxy comonomer $[P_3N_3Y_4(OR)_2]$ which may be copolymerized with the dihalo blocked derivative $[P_3N_3Y_4X_2]$ or another comonomer.

The substitution of the halo groups with alkoxy groups, either for the formation of the monomer or the comonomer, may be accomplished by two basic procedures.

The first method calls for reacting the suitably blocked phosphonitrile halide with an alkali metal alkoxide, e.g., sodium ethoxide, in a solvent medium, as illustrated the Example XVI and XVIII. The alkoxide is a derivative of a normal alcohol having from 1 to 4 carbon atoms, viz., methanol, ethanol, n-propanol and n-butanol. Generally, the corresponding alcohol is employed as a solvent; e.g., where sodium ethoxide is the alkoxylating agent, ethanol is the preferred solvent; however, where it is desired to perform the reaction at high temperatures polyether solvents having a boiling point of from 75 to 300° C. are most advantageous. These include the dimethylether of diethylene glycol, the dimethyl ether of triethylene glycol and the dimethyl ether of tetraethylene glycol.

About one mole of alkoxylating agent is used for each halo group to be replaced. The following table illustrates the appropriate reaction conditions and solvent concentration:

TABLE A

|  | Broadly | Preferably |
|---|---|---|
| Temperature, ° C | 0°–200° | 20°–160° |
| Time, hrs | 4–160 | 12–24 |
| Solvent/blocked comp., moles/mole | 360–50 | 180–75 |

The second method for replacing the halo groups is by reaction with a ternary base in the presence of an excess of alcohol, the latter acting both as the alkoxylating agent and the solvent. The alcohols are again normal alcohols having 1 to 4 carbon atoms. This technique is illustrated in Examples XV and XVI.

In this method the amount of the ternary base added to the reaction mixture determines the number of halo groups replaced. Examples of suitable ternary bases are the ternary amines having from 5 to 10 carbon atoms, such as pyridine, triethylamine, quinoline and triethylene diamine. From 1 to 3 moles of the ternary base are employed for each halo group to be replaced. The reaction results in the formation of the ternary amine hydrochloride. Reaction conditions are shown in the following table:

TABLE B

|  | Broadly | Preferably |
|---|---|---|
| Temperature, ° C | 0°–140° | 25°–100° |
| Time, hrs | 2–120 | 12–24 |
| Solvent/blocked comp., moles/mole | 360–50 | 180–75 |

Thusly, the following derivatives can be prepared from phosphonitrile halides:

2-methoxy-2,4,4,6,6-pentaphenoxytriazatriphosphorine;
2-ethoxy-2,4,4,6,6-pentaphenoxytriazatriphosphorine;
2-n-propoxy-2,4,4,6,6-pentaphenoxytriazatriphosphorine;
2-n-butoxy-2,4,4,6,6-pentaphenoxytriazatriphosphorine;
2,4-dimethoxy-2,4,6,6-tetraphenoxytriazatriphosphorine;
2,4-diethoxy-2,4,6,6-tetraphenoxytriazatriphosphorine;
2-ethoxy-4-chloro-2,4,6,6-tetraphenoxytriazatriphosphorine;
2-butoxy-4-bromo-2,4,6,6-tetraphenoxytriazatriphosphorine;
2,4-dibutoxy-2,4,6,6-tetraphenoxytriazatriphosphorine;
2-methoxy-4-propoxy-2,4,6,6-tetraphenoxytriazatriphosphorine;
2-methoxy-4,6-dichloro-2,4,6-triphenoxytriazatriphosphorine;
2,4-diethoxy-6-bromo-2,4,6-triphenoxytriazatriphosphorine;
2,4,6-triethoxy-2,4,6-triphenoxytriazatriphosphorine;
2,4-diethoxy-6-butoxy-2,4,6-triphenoxytriazatriphosphorine;
2-ethoxy-2,4,4,6,6,8,8-heptaphenoxytetrazatetraphosphorine;
2-methoxy-4-chloro-2,4,6,6,8,8-hexaphenoxytetrazatetraphosphorine;
2,4-dibutoxy-6-bromo-2,4,6,8,8-pentaphenoxytetrazatetraphosphorine;
2,6-dipropoxy-4-chloro-2,4,6,8,8-pentaphenoxytetrazatetraphosphorine;
2,4,6,8-tetraethoxy-2,4,6,8-tetraphenoxytetrazatetraphosphorine;
2,4-diethoxy-2,4-dichloro-6,6-diphenyltriazatriphosphorine.

Generally, the compounds may be represented by the following formulas:

$P_3N_3Y_5(OR)$; $P_3N_3Y_4(OR)_2$, $P_3N_3Y_3(OR)_3$
$P_3N_3Y_4(OR)X$, $P_3N_3Y_3(OR)X_2$, $P_3N_3Y_3(OR)_2X$
$P_4N_4Y_7(OR)$; $P_4N_4Y_6(OR)_2$, $P_4N_4Y_5(OR)_3$
$P_4N_4Y_4(OR)_4$, $P_4N_4Y_6(OR)X$, $P_4N_4Y_5(OR)X_2$
$P_4N_4Y_4(OR)X_3$, $P_4N_4Y_5(OR)_2X$, $P_4N_4Y_4(OR)_2X_2$
$P_4N_4Y_5(OR)_2X$, $P_4N_4Y_4(OR)_3X$ where Y is a blocking group as previously described, OR is an n-alkoxy group having 1 to 4 carbon atoms, and X is chloro- or bromo-.

It will be obvious to those skilled in the art that the above formulas represent an exceedingly large number of compounds and isomers.

When a monohalo monoalkoxy triazatriphosphorine compound (the other four substitutable positions on the nucleus being occupied by one or more of the types of said blocking groups) is subjected to condensation polymerization conditions, intermolecular elimination of alkyl halide occurs and adjacent triazatriphosphorine nuclei become linked by oxygen atoms joined to phosphorus atoms of adjacent triazatriphosphorine nuclei, to form a thermoplastic, linear polymer. Thus, for instance, when monochloro-monoethoxy-tetraphenoxy - 1,3,5,2,4,6 - triazatriphosphorine is subjected to condensation polymerization conditions, ethyl chloride is eliminated from adjacent triazatriphosphorine nuclei, leaving the phosphorus atoms of these nuclei linked by O in a P—O—P configuration. These polymers contain no organic groups as part of the principal chains, although they do contain organic substituents (phenoxy groups in the case of the example). The exclusively inorganic nature of the principal chains (or "backbones") of these molecules endows the polymers with exceptional physical properties, notably excellent resistance to high temperature, to oxidation, to being ignited and to supporting combustion. These polymers are useful materials for the making of insulators for electrical motors which are to be used in high temperature service.

It is convenient to prepare a low molecular weight prepolymer which melts at 60 to 100° C. and is soluble in the common organic solvents such as acetone, methyl ethyl ketone, carbon tetrachloride and benzene. This prepolymer can then conveniently be shaped to the form of the desired finished object. Upon further heating for 1 to 5 hours at 350° C., further polymerization with the evolution of only small additional quantities of alkyl halide results, yielding a clear, hard, resinous product. The degree of cross-linking is, of course, a function of the proportion of tri-functional material present in the starting material. The shaping of the prepolymer can be achieved by any of the standard procedures of molding, casting, depositing from solution, etc. which are familiar to those skilled in the art of shaping organic polymers.

Example I.—The preparation of $P_3N_3(OC_6H_5)_4Cl_2$

Part A.—Equimolar amounts of sodium and phenol were added to isopropyl alcohol to form a sodium phenoxide solution. After this reaction was completed, phosphonitrilic chloride trimer was added incrementally as a solid at room temperature under an inert atmosphere. The reaction was exothermic, and was maintained under 40° C. during addition.

At the end of the reaction period the product was filtered to remove sodium chloride, and the combined filtrate and filter cake wash was evaporated. The residue was taken up in 4 to 6 parts, by weight, of benzene, and the solution was washed with 5% sodium hydroxide solution until phenol-free, and finally with distilled water. The solution was dried over a Linde 4A molecular sieve and stripped of benzene by high vacuum solvent evaporation. A colorless oil was isolated which was weighed to determine the yield of partially blocked compounds.

The following table illustrates a series of runs using various solvent concentrations, reaction temperatures and times:

trum in two sets of partially broadened doublets showing average chemical shifts of 2.40 and 2.63 p.p.m. (at 54 m.c./s). The splitting values were 12.6 for both the

TABLE I

| Run No. | $P_3N_3Cl_6$, moles | $C_6H_5ON$ moles [1] | Solvent, ml. | Temperature, °C. | Reaction time, hrs. | Yield Gms. | Yield percent | $n_D^{20}$ | Percent $Cl_2$ |
|---|---|---|---|---|---|---|---|---|---|
| 1 | 0.1 | 0.40 | 800 | 82 | 4.5 | 55.8 | 97 | 1.5878 | 12.47 |
| 2 | 0.4 | 1.6 | 3,200 | 82 | 7 | 224.0 | 97 | 1.5877 | 12.07 |
| 3 | 0.4 | 1.6 | 3,200 | 82 | 6 | 223.0 | 97 | 1.5880 | 12.20 |
| 4 | 0.4 | 1.6 | 3,200 | 29 | 163 | 226 | 98 | 1.5878 | 12.84 |
| 5 | 0.8 | 3.2 | 3,000 | [1] 25 | 12 | 450 | 97 | 1.5880 | 12.11 |
| 6 | 0.1 | 0.4 | 150 | [1] 24-46 | 18 | 55.6 | 96 | 1.5884 | 12.76 |
| 7 | 3.0 | 12.0 | 7,000 | [1] 19-43 | 18 | 1,708 | 98 | 1.5880 | 12.11 |
| 8 | 4.0 | 16.0 | 6,500 | [1] 20-22 | 20 | 2,248 | 97 | 1.5888 | |

[1] Reaction then heated to 82° C. for 5 hours at this temperature.
[2] Percent Cl, theory=12.26%.

These runs which are shown in Table I indicate the wide ranges of temperature, time and concentration conditions that can be used to prepare the derivative. In the case of run 4, it is noted that the reaction is slow at room temperature and complete formation to $$P_3N_3(OC_6H_5)_4Cl_2$$

has not been obtained as observed from the high percent Cl. Similarly in run 6, at high concentration, 0.67 M in $P_3N_3Cl_6$, complete formation of $P_3N_3(OC_6H_5)_4Cl_2$ was not achieved.

The products obtained from these reactions were all colorless, slightly opaque oils at room temperature. The complete analysis shows these products to analyze correctly for $P_3N_3(OC_6H_5)_4Cl_2$. This is demonstrated below in Table II, a comparison of complete analysis of representative samples:

TABLE II

| Run Number | Percent C | Percent H | Percent Cl |
|---|---|---|---|
| $P_3N_3(OC_6H_5)_4Cl_2$ (theory) | 49.85 | 3.47 | 12.26 |
| #1 | 49.25 | 3.14 | 12.47 |
| #3 | 49.88 | 4.67 | 12.20 |
| #5 | 49.52 | 3.59 | 12.11 |

The infrared spectra of these oils show the presence of $P_3N_3$ rings and the typical monosubstituted aromatic bands which show phenoxy and do not show any aliphatic C—H or P—O—C (aliphatic) types of infrared absorptions. This last fact is also verified by proton NMR spectroscopy. An examintion of reaction rates shows that 3 moles of sodium phenoxide react fast with each mole of trimer, than a fourth mole goes in more slowly.

Part B.—In order to elucidate the structure of these oils, 11.6 g. (0.02 mole) of the oil from run #3 was treated with excess, gaseous dimethyl amine in 100 ml. of diethyl ether at 0° C. 11.0 g. (93%) of a colorless oil was isolated which contained only 0.16% of residual chlorine. The oil was examined by proton NMR spectroscopy and the position of the dimethyl amino protons was noted. There were 37.6% of aliphatic protons (theory for $P_3N_3(OC_6H_5)_4[N(CH_3)_2]_2$ is 37.5%) in the spectrum in two sets of partially broadened doublets. These data are consistent with a mixture of cis and trans isomers of non-geminal dimethylamino groups,

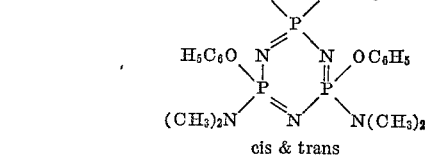
cis & trans and not with the geminal structure, i.e.

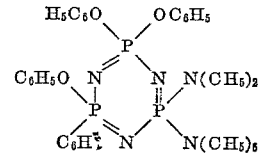

(See C. T. Ford, F. E. Dickson and I. I. Bergman, Inorg. Chem 3,177 (1964).)

By contrast, a solid isomer which analyzed a $$P_3N_3(O_6CH_5)_4Cl_2$$

was obtained in acetone solvent, M.P. 75-77° C. (McBee, E. T. Final Report, Contract DA33-008-ORD-1156 and DA33-008-ORD-2131 (Jan. 16, 1956, to Nov. 30, 1962) Astia Report No. AD295632). The $P^{31}$ NMR spectrum shows this isomer to contain geminal chlorines. Examination of this product and the oils described above by infrared spectroscopy in $CS_2$ solution show differences in the band structure attributed to $P_3N_3$ ring absorptions (1200-1275 cm.$^{-1}$).

Example II.—Preparation of $P_3N_3(OC_6H_5)_3Cl_3$

Following the procedure set forth in Example 1 a sodium phenoxide solution was prepared. Phosphonitrilic chloride trimer was added to the soltuion at 80° C. and allowed to warm to room temperature. The work up was similar to that described in Example I. The ratio of reactants, time, temperatures and yields obtained are described in the following table:

TABLE III

| | $P_3N_3Cl_6$, moles | $C_6H_5ON$[1] moles | Solvent, ml. | Temperature, °C. | Reaction time, hours | Yield Gms. | Yield Percent | $n_D^{20}$ Product | Percent $Cl_1$ |
|---|---|---|---|---|---|---|---|---|---|
| Run No.: | | | | | | | | | |
| 1 | 0.4 | 1.2 | 3,000 | 25-28 | [2] 48 | 202 | 97 | 1.5808 | 20.60 |
| 2 | 0.8 | 2.4 | 3,000 | 20-80 | [3] 24 | 409 | 98 | 1.5806 | 20.09 |
| 3 | 4.0 | 12.0 | 7,000 | 20-80 | [3] 24 | 2,048 | 98 | 1.5818 | |

[1] Percent Cl (theory)=20.40 for $P_3N_3(OC_6H_5)_3Cl_3$.
[2] Maintained at room temperature for entire period.
[3] Maintained at room temperature for about 20 hours, thereafter refluxed at 80° C. for 1½ hours.

It is seen upon examination of Table III that a variety of solvent concentrations and temperature-time variations can be employed to obtain the desired product. The reaction is rapid at both room temperature and elevated temperatures. This is verified by rate data.

The products are colorless oils at room temperature and show infrared spectra very similar to those of the Example I products. The proton NMR spectra do not show any aliphatic hydrogens, hence the products are not contaminated by side reactions with the solvent. The verification of the product formation of $$P_3N_3(OC_6H_5)_3Cl_3$$

is illustrated by comparison of the analysis of the oil from run No. 1 and theory, shown in Table IV:

TABLE IV

| | Percent C | Percent H | Percent Cl |
|---|---|---|---|
| Run No.: | | | |
| 1 | 41.26 | 2.91 | 20.60 |
| Theory | 41.60 | 2.91 | 20.40 |

In order to determine the structure of this compound, a sample of the oil from run No. 1 was reacted with excess gaseous dimethylamine at 0° C. in diethyl ether. An oil was isolated in 93% yield which solidified. This crude material contained some oil but between 60% and 85% of the residue was solid. The solid was recrystallized and melted between 93–95° C. The proton NMR spectrum was in agreement with the trans structure

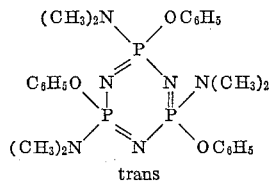

trans (Δ=2.57, 2.30 p.p.m., splitting value 12.4 c./s. at 56.4 mc./s.)

The same product was isolated from the following sequence of reactions. The first reaction is known to produce the non-geminal compound. (Becke-Goehring).

(1)
$$P_3N_3Cl_6 + 6(CH_3)_2NH \text{ (aqueous)} \xrightarrow{(C_2H_5)_2O}$$
$$P_3N_3[N(CH_3)_2]_3Cl_3 + 3(CH_3)_2NH_2Cl$$

(2)
$$P_3N_3[N(CH_3)_2]_3Cl_3 + 4NaOC_6H_5 \xrightarrow{CH_3O-CH_2CH_2-OCH_3}$$
$$P_3N_3[N(CH_3)_2]_3(OC_6H_5)_3 + 3NaCl \text{ (M.P. 99–100° C.)}$$

Example III.—Preparation of $P_3N_3(OC_6H_5)_5Cl$

This compound was synthesised as a chain-terminating monomer and was prepared by reacting 0.8 mole of $P_3N_3Cl_6$ with 4.0 moles of sodium phenoxide in three liters of isopropanol. The $P_3N_3Cl_6$ was added at 0° C.; the solution was maintained at room temperature for 12 hours, and then refluxed for 5 hours. The reaction mixture was added to 9 liters of distilled water and extracted with three 1-liter portions of benzene. The benzene solution was dried over $MgSO_4$. About 429 grams of a yellow oil were isolated (85% yield). The oil slowly crystallized and formed a solid completely. It was recrystallized from heptane-acetone solution; M.P. 68–70° C., analysis for $P_3N_3(OC_6H_5)_5Cl$: C=56.66%, H=3.96%, Cl=5.58%; found: C=56.67%, H=3.87%, Cl=5.67%.

EXAMPLE IV

The preparation of $P_3N_3(C_6H_5)_2Cl_4$ is as described in Bode et al., Ber. Deut. Chem. Ges. 75 B, 215 (1942) by the Friedel-Crafts reaction of $P_3N_3Cl_6$ in benzene with aluminum chloride. The product has both phenyl groups on one phosphorus atom in the trimer ring. In a 500 ml. round-bottomed flask fitted with a reflux condenser were placed 250 ml. of isopropanol dried over 4A molecular sieve, 9.68 g., 0.103 mole, a 3% excess) of phenol, and 2.37 g. (0.103 mole, a 3% excess) of metallic sodium. The mixture was heated to reflux, and when the sodium had dissolved, $P_3N_3(C_6H_5)_2Cl_4$ (1,1-diphenyl-3,3,5,5-tetrachlorotriazatriphosphorine) (2155 g., 0.05 mole) was added. The reaction mixture was then refluxed for five hours; the sodium chloride which had formed was filtered off on a sintered glass filter prepared with a bed of diatomaceous earth. As the filtrate cooled, the product slowly crystallized out, and after a few days was filtered off; yield, 5.79 g. (21.2%), M.P. 120–125° C. A second crop was obtained by reducing the volume to about 100 cc. and allowing to stand for several days, yielding a further 11.2 g. (41%), M.P. 115–120° C. The total yield of crystalline product was therefore 62%.

The infrared spectra of both crops of crystals were identical as were the elemental analyses for $$P_3N_3(OC_6H_5)_2(C_6H_5)_2Cl_2$$

C=52.77%. H=3.69%, N=7.68%; found: C=53.07%, H=3.91%, N=7.70%. An examination of the rate of this reaction shows that the first two phenoxy groups go to $P_3N_3(C_6H_5)_2Cl_4$ rapidly; further substitution then occurs at a slower rate.

Example V

According to the procedure described in Example I, 0.1 mole of $P_3N_3Cl_6$ was reacted with 0.3 mole of $NaSC_6H_5$ in 500 ml. of dry isopropanol under a nitrogen atmosphere. The reaction mixture was left at room temperature for 15 hours, then refluxed for three hours and the product was isolated: 51.8 g. of a yellow oil (91% yield) was collected. The material analyzed as follows: theory for $$P_3N_3(OC_6H_5)_3Cl_3$$

C=38.01%, H=2.65%; found: C=37.80%, 37.90%, H=3.20%, 3.39%. This experiment shows the application of a sulfur-containing blocking group.

Example VI 0.1 mole of $P_3N_3(OC_6H_5)_3Cl_3$, prepared as in Example II, was reacted with 0.1 mole of $KOC_6H_5$ which had been prepared in toluene, isolated, and dissolved in 150 ml. isopropanol. The isopropanol solution was added dropwise to the phosphonitrile in 750 ml. of isopropanol. The product was isolated as a colorless oil in 92% yield ($n_D^{20}$=1.5876). Physical measurements and elemental analysis agreed with the formula $P_3N_3(OC_6H_5)_4Cl_2$; theory, Cl=12.26%; found: Cl=12.19%, 12.33%.

Example VII

According to the procedure of Example I, 0.3 mole of p-cresol is dissolved in 350 ml. of dry 2-butanol and reacted with 0.3 mole of metallic sodium. After complete evolution of hydrogen, 0.1 mole of $P_3N_3Cl_6$ is added rapidly in 150 ml. of 2-butanol and the reaction is run at room temperature for 12 hours, then refluxed at 98° C. for 4 hours. The solvent is separated by vacuum evaporation and replaced with benzene, and the residue worked up in the usual manner to obtain the product,

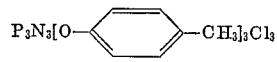

Example VIII 0.2 mole of the sodium salt of o-chlorophenol was prepared by the reaction of 0.2 mole of o-chlorophenol with a 10% excess of sodium hydride in mineral oil in 500 ml. of dry, peroxide-free tetrahydrofuran. The unreacted hydride was separated by filtration and the tetrahydrofuran solution was evaporated. The residual solid was dissolved in 500 ml. of isopropanol and 0.05 mole of $P_3N_3Cl_6$ was added. A white precipitate formed immediately and the solution was stirred for 80 hours at room temperature (25° C.). The solution was then reacted at 82° C. for 2 hours and worked up according to Example I. The product,

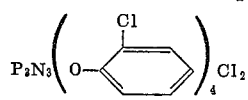

was obtained as a yellow oil in a yield of 64%. The oil showed no aliphatic C—H in the infrared spectrum and analyzed as follows: C=39.45%, H=2.47%; theory for $P_3N_3(OC_6H_4Cl)_4Cl_2$; C=40.26, H=2.25%.

Example IX

According to the general procedure described in Example I, 0.4 mole of the sodium salt of meta-fluoromethylphenol, $NaOC_6H_4CF_{3(m)}$, is prepared in 600 ml. of a mixture of dry 2- and 3-pentanols (B.P. 113–120° C.) by reacting m-$CF_3C_6H_4OH$ with metallic sodium. Solid $P_3N_3Cl_6$, 0.1 mole, is added and the reaction is stirred for 24 hours at room temperature, then heated at 95° C. for 6 hours. The alcohol solvent is removed by high vacuum distillation and replaced with benzene. The product,

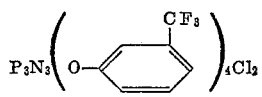

is obtained in high yield after work-up of the reaction mixture in the usual manner.

Example X p-LiS—$C_6H_4$—Cl, 0.3 mole, is prepared by reacting a 10% excess of LiH (in mineral oil) with 0.3 mole of p-chlorobenzenethiol in 400 ml. of tetrahydrofuran. The excess LiH is removed by filtration and the tetrahydrofuran is evaporated and replaced by 300 ml. of cyclohexanol. 0.1 mole of $P_3N_3Cl_6$ is added at 40° C. and the reaction is run for 100 hours at this temperature. The cyclohexanol is evaporated under high vacuum (80° C.) and replaced with benzene. The product

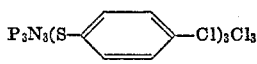

is isolated in good yield after work-up in the usual manner.

Example XI

A 10% excess of sodium hydride is reacted with 0.15 mole of pentachlorophenol in 300 ml. of tetrahydrofuran. The clear solution is separated from the unreacted hydride, then evaporated. The solid is put into 500 ml. of dry isopropanol and reacted with 0.05 mole of $P_3N_3Cl_6$ for 12 hours at room temperature, and then at reflux, 82° C., for another 15 hours. The reaction mixture is cooled and 0.05 mole of sodium phenoxide in 100 ml of dry isopropanol is added. The reaction mixture is heated to reflux and refluxed at 82° C. for 12 hours, cooled, and worked up in the previously described manner to yield $P_3N_3(OC_6Cl_5)_3(OC_6H_5)Cl_2$ in good yield.

Example XII 0.1 mole of a mixture of 80% $P_3N_3Cl_6$ and 20% $P_4N_4Cl_8$ is reacted with 0.44 mole of sodium phenoxide in 700 ml. of dry isopropanol at room temperature for 24 hours and then is refluxed at 82° for 5 hours. The isopropanol is removed by evaporation and the product, a pale yellow oil mixture of difunctioned derivatives, is isolated in high yield by work-up in benzene as described in the previous preparation.

Example XIII

By reacting 0.02 mole of $P_4N_4Cl_8$ with 0.08 mole of sodium phenolate in 200 ml. of dry isopropanol at room temperature for 48 hours, followed by refluxing at 82° C., the product, $P_4N_4(OC_6H_5)_4Cl_4$ is isolated in high yield.

Example XIV

That the use of solvent other than the secondary alcohols of the invention is less satisfactory was illustrated by a series of comparative runs. The particular solvents, reactant concentrations and conditions, and yields are shown in the following table:

TABLE V

| Run No.: | Solvent | Moles, $P_3N_2Cl_6$ | Moles, $NaOC_6H_5$ | Ml. of Solvent | Reaction time, hr. | Yield, gms. | Yield Percent [1] | Percent [2] |
|---|---|---|---|---|---|---|---|---|
| 1 | Ethanol | 0.1 | 0.4 | 500 | 65 | 47.1 | 82 | 12.80 |
| 2 | Acetone | 0.1 | 0.4 | 750 | 65 | 25.4 | 44 | 8.36 |
| 3 | Monoglyme [3] | 0.1 | 0.4 | 500 | 65 | 38.5 | 66.5 | 9.64 |
| 4 | Benzene | 0.1 | 0.4 | 700 | 65 | 33.5 | 58 | 33.08 |
| 5 | Diethyl ether | 0.1 | 0.4 | 700 | 65 | 33.2 | 58 | 23.52 |
| 6 | Hexanol | 0.1 | 0.4 | 300 | 48 | 44.3 | 77 |  |

[1] Yield based in $P_3N_3(OC_6H_5)_4Cl_2$ formation.
[2] Percent Cl theory for $P_3N_3(OC_6H_5)_4Cl_2$=12.26%.
[3] 1,2-dimethoxyethane.

Examination of the table illustrates that the yield and chlorine contents are low in runs 2 and 3 and shows that in these particular solvents the reaction is less sensitive and the products with few phenoxy groups, i.e., $P_3N_3Cl_6$, $P_3N_3Cl_5(OC_6H_5)$, $P_3N_3Cl_4(OC_6H_5)_2$, are being removed from the reaction mixture during work-up. In runs 4 and 5, the high chlorine content and low yield indicate a general incompleteness of reaction. In runs #1 and #6, the solvent participated in the reaction and the presence of P—O—R where R is ethyl or hexyl groups was detected by infrared and NMR in the product.

Example XV

In 500 ml. of dry ethanol, 0.1 mole of

prepared in Example I, was reacted in the presence of 0.8 mode of pyridine for 15 hours at reflux in an inert atmosphere. The excess ethanol solvent was removed by evaporation and replaced with benzene. The solid pyridine hydrochloride by-product was removed by filtration and the benzene solution was washed with 3 N HCl solution until free of pyridine. It was then washed with water and dried over a 4A molecular sieve. A colorless oil was isolated in 97% yield which had less than 0.1% residual chlorine in the product. The product analyzed as follows: C=56.02%, H=5.30%; theory for

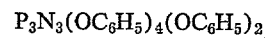

C=56.28%, H=5.06%.

Example XVI

In 400 ml. of dry n-butanol, 0.25 mole of metallic sodium is dissolved and 0.1 mole of $P_3N_3(OC_6H_5)_4Cl_2$ from Example I is added in 100 ml. of dry n-butanol. The solution is refluxed for 12 hours at 117° C. The solvent is evaporated by high vacuum distillation, then the product is dissolved in a benzene-water mixture. The benzene layer is separated, washed twice more with water and dried. The product, $P_3N_3(OC_6H_5)_4(OC_4H_9)_2$, is isolated by high vacuum vacuum evaporation of the solvent.

Example XVII

Partial substitution of the product from Example I, $P_3N_3(OC_6H_4)_4Cl_2$, with ethoxy groups is achieved by reacting 0.1 mole of the product of Example I with 0.1 mole of pyridine in 500 ml. of dry ethanol for 12 hours at 80° C. The product, $P_3N_3(OC_6H_5)_4(OC_2H_5)Cl$, is isolated in good yield by the work-up procedure described in Example XV.

Example XVIII

Partial substitution of the product from Example I, $P_3N_3(OC_6H_4)_4Cl_2$, with butoxy groups can be achieved by reacting 0.1 mole of metallic sodium in 400 ml. of dry n-butanol and then adding 0.1 mole of $P_3N_3(OC_6H_4)_4Cl_2$ in 100 ml. of n-butanol in an inert atmosphere. The reaction is run at room temperature for 48 hours and the product, $P_3N_3(OC_6H_5)_4(OC_4H_9)Cl$, is isolated in good yield after work-up as described in Example XVI.

Example XIX

Part A.—Equimolar amounts (0.05 ml.) of $$P_3N_3(OC_6H_5)_4Cl_2$$

prepared as described in Example I, and $$P_3N_3(OC_6H_5)_4(OC_2H_5)_2$$

prepared as described in Example XV were thoroughly mixed in a polymer tube under an inert atmosphere and then heated at 270° C. for one hour. Ethyl chloride was evolved and an 11% weight loss occurred. The prepolymer that was formed is soft and flows readily at 60° C. The prepolymer molecular weight (number average) is around 1500 units. This material is heated further for two hours at 350° C. under nitrogen with further weight loss. The product is yellow in color, mobile at 350° C., and solidifies on cooling. The solid is soluble in a 50–50 mixture of acetone and benzene and can be reprecipitated in heptane in about 80% yield as a white powder that melts and is soluble in organic solvents, with a molecular weight (number average) 7000.

Part B.—Attempts to make $P_3N_3(OC_6H_5)_4Cl_2$ free of ethoxy substitution in one step in ethanol under the conditions of Example I were not successful. The product described in Example XIV, run 1, had the average formula $P_3N_3(OC_6H_5)_{3.5}(OC_6H_5)_{0.5}Cl_2$. This could be converted by the method described in Example XVI, using ethanol instead of butanol, to $$P_3N_3(OC_6H_5)_{3.5}(OC_2H_5)_{1.25}Cl_{1.25}$$

Thermal polymerization of this monomer under the conditions describe above yields a material which is not soluble in organic solvents and cannot by purified or cast into a film.

Tetraphenoxy derivatives prepared in other solvents are not obtained in molecular weights that are higher than 3000.

Example XX

A polymer is obtained by thermally polymerizing the product from Example XVII at 270° C. for one hour and at 350° C. for two hours under an inert atmosphere of nitrogen. The polymer is soluble in acetone-benzene solvent and can be reprecipitated in heptane. It is similar in molecular weight to that material that is obtained from the copolymerization described in Example XIX,

Having thus described our invention, what I claim and desire to protect by Letters Patent is:

1. In the process for preparing a partially blocked derivative of a cyclic phosphonitrilic halide having a ring consisting of three or four —P=N— groups and a plurality of halo groups bonded to said ring which comprises: reacting said halide with a preformed alkali metal salt of a blocking group, said group being a phenoxy or a thiophenoxy group or a ring-substituted derivative thereof, thereby replacing at least one halo group with a blocking group, about a mole of said alkali metal salt being present for each halo group to be replaced: the improvement which consists of the use of a secondary alcohol as sole solvent.

2. The process of claim 1 wherein said partially blocked derivative is reacted with a lower alkanol in the presence of a ternary base to form a polymerizable material.

3. The process of claim1 wherein said partially blocked derivative is reacted with an alkali metal alkoxide to form a polymerizable material.

4. The process of claim 1 wherein said phenoxy- or thiophenoxy-derivative further comprises from 1 to 5 alkyl, halo, fluoromethyl, phenyl, phenoxy, benzyl groups or combinations thereof, the total number of carbon atoms in each substituent group being no more than eight.

5. The process of claim 1 wherein said secondary alcohol has from 3 to 12 carbon atoms.

6. The process of claim 5 wherein said secondary alcohol is isopropanol.

7. The process of claim 1 wherein said blocking group is a phenoxy group.

8. The process of claim 1 wherein said cyclic phosphonitrilic halide is 2,2,4,4,6,6-hexahalo-1,3,5,2,4,6-triazatriphosphorine.

9. The process of claim 8 wherein the halide is a chloride or a bromide.

10. A process for preparing 2,4-dichloro-2,4,6,6-tetraphenoxy-1,3,5,2,4,6-triazatriphosphorine which comprises: reacting hexachloro-1,3,5,2,4,6-triazatriphosphorine with a prefromed alkali metal phenoxide in a molar ratio of about one to four in isopropanol solution, thereby forming 2,4-dichloro-2,4,6,6-tetraphenoxy-1,3,5,2,4,6-triazatriphosphorine as a reaction product.

11. A process for preparing 2,4,6-trichloro-2,4,6-triphenyloxy-3,5,2,4,6-triazatriphosphorine which comprises: reacting hexachloro-1,3,5,2,4,6-triazatriphosphorine with a preformed alkali metal phenoxide in a molar ratio of about one to three in an isopropanol solution.

References Cited

FOREIGN PATENTS 1,343,907  10/1963  France.

OTHER REFERENCES

Garner et al.; Gov't. Report—AD 608982, Feb. 5, 1965, pp. 6–15 and 23–27.

Garner et al.: Gov't. Report—AD 428598, Apr. 20, 1964, pages 3 and 9–18.

Tolstoquizov et al.: Russ. J. Inorg., Chem. 10 382–383 (March 1965).

Fitzsimmons et al.: J. Chem. Soc. 1964, 1735–1741.

Ford et al.; Inorg. Chem. 4 419–420 (March 1965).

WILLIAM H. SHORT, Primary Examiner

M. GOLDSTEIN, Assistant Examiner

U.S. Cl. X.R.

260—2, 47, 79, 927